United States Patent
Weiss (10) Patent No.: US 9,862,548 B2
(45) Date of Patent: Jan. 9, 2018

(54) DRIVE UNIT

(71) Applicant: WEISS GmbH, Buchen (Odw.) (DE)

(72) Inventor: Uwe Weiss, Buchen (DE)

(73) Assignee: WEISS GMBH, Buchen (ODW.) (DE)

( * ) Notice: Subject to any disclaimer, the term of this patent is extended or adjusted under 35 U.S.C. 154(b) by 0 days.

(21) Appl. No.: 15/313,180

(22) PCT Filed: May 28, 2015

(86) PCT No.: PCT/EP2015/061806
§ 371 (c)(1),
(2) Date: Nov. 22, 2016

(87) PCT Pub. No.: WO2015/181277
PCT Pub. Date: Dec. 3, 2015

(65) Prior Publication Data
US 2017/0190514 A1      Jul. 6, 2017

(30) Foreign Application Priority Data

May 30, 2014   (DE) .................. 10 2014 107 654

(51) Int. Cl.
*B65G 33/02*  (2006.01)
*B65G 35/06*  (2006.01)
(Continued)

(52) U.S. Cl.
CPC .......... *B65G 35/066* (2013.01); *B23Q 5/341* (2013.01); *B23Q 7/1463* (2013.01); *B65G 23/20* (2013.01)

(58) Field of Classification Search
CPC ..... B65G 35/06; B65G 35/063; B65G 35/066
(Continued)

(56) References Cited

U.S. PATENT DOCUMENTS 4,676,362 A * 6/1987 Malzkorn ................ B23Q 5/40
                                                      198/465.1
5,097,935 A * 3/1992 Weiss ..................... B23Q 7/005
                                                      198/465.3
(Continued)

FOREIGN PATENT DOCUMENTS

DE       2845976 A1    4/1980
DE       3131165 C1    3/1983
(Continued)

OTHER PUBLICATIONS

English Translation of International Preliminary Report on Patentability for International Application No. PCT/EP2015/081806 dated Dec. 6, 2016, 6 pages.
(Continued)

*Primary Examiner* — James R Bidwell
(74) *Attorney, Agent, or Firm* — Cantor Colburn LLP (57) ABSTRACT

A drive unit for driving a carriage which can be displaced along a transporting path comprises a barrel cam, which can be driven to rotate and has a drive groove for engagement of a driver arranged on the carriage, and also comprises a control device for controlling the drive of the carriage. The barrel cam has a first barrel portion and a second barrel portion, which is separate from the first, wherein the barrel portions can be driven independently of one another, and wherein the control device is designed so that, once the carriage has been received from a separate drive unit, it can accelerate the carriage with the first barrel portion and can supply the accelerated carriage to the second barrel portion.

15 Claims, 5 Drawing Sheets

(51) Int. Cl.
*B23Q 5/34* (2006.01)
*B23Q 7/14* (2006.01)
*B65G 23/20* (2006.01)

(58) Field of Classification Search
USPC .............................. 198/467.1, 465.3, 459.3
See application file for complete search history.

(56) References Cited

U.S. PATENT DOCUMENTS

| | | | |
|---|---|---|---|
| 5,881,649 A | | 3/1999 | Hasegawa et al. |
| 5,906,262 A | * | 5/1999 | Miki ..................... B65G 54/02 |
| | | | 198/341.02 |
| 6,648,126 B2 | | 11/2003 | Mayer et al. |
| 8,720,669 B2 | * | 5/2014 | Iba ........................ B61B 13/125 |
| | | | 198/467.1 |

FOREIGN PATENT DOCUMENTS

| | | |
|---|---|---|
| DE | 4104317 A1 | 8/1991 |
| DE | 29908094 U1 | 11/2000 |
| DE | 102011113000 A1 | 3/2013 |
| EP | 0089543 A1 | 9/1983 |
| EP | 0127584 A1 | 12/1984 |
| EP | 0144478 A1 | 6/1985 |
| FR | 2156497 A1 | 6/1973 |
| JP | 2011105427 A | 6/2011 |
| WO | 8000559 A1 | 4/1980 |

OTHER PUBLICATIONS

English Translation of International Search Report for International Application No. PCT/EP2015/061806 dated Aug. 3, 2015, 2 pages.
English Translation of Written Opinion for International Application No. PCT/EP2015/061806 dated Oct. 5, 2016, 5 pages.
German Search Report for German Application No. 102014107654.0 dated May 28, 2015, 2 pages.
International Preliminary Report on Patentability for International Application No. PCT/EP2015/061806 dated Dec. 6, 2016, 6 pages.
International Search Report for International Application No. PCT/EP2015/061806 dated Aug. 3, 2015, 3 pages.
Written Opinion for International Application No. PCT/EP2015/061806 dated Aug. 3, 2015, 5 pages.

* cited by examiner

DRIVE UNIT

CROSS-REFERENCES TO RELATED APPLICATIONS

This patent application is a 371 of International Application No. PCT/EP2015/061806, filed May 28, 2015 which claims the priority of German Application No. 102014107654.0, filed May 30, 2014 which is incorporated herein by reference in its entirety.

BACKGROUND

The present invention relates to a drive unit for driving a carriage travelable along a transport path having a barrel cam which can be driven to make a rotational movement and which has a drive groove for an engagement of a follower arranged at the carriage, and having a control device for controlling the drive of the carriage.

Such drive units are used in assembly and automation engineering, for example, to move travelable carriages having workpieces arranged thereon positionally accurately to the corresponding machining and/or assembly stations. In this respect, a transfer of the carriages from a separate drive unit—such as from a belt drive—to a drive unit having a barrel cam may be necessary. It is, however, difficult in practice to coordinate the arrival of the carriages at a continuously or intermittently rotating barrel cam with the barrel movement such that the followers of the carriages engage into the drive groove of the barrel cam as a result of the movement. It is therefore possible that the carriages have to be braked a lot or even stopped before the transfer to the barrel cam, which reduces the effectiveness of the total system. It is equally unfavorable with respect to the effectiveness to move the barrel cam into a defined rotational position for the takeover of a carriage since, as a rule, at least one follower of a preceding carriage is in engagement with the drive groove and would then be moved by adopting the rotational position. That is, the reception of a carriage in the drive region of the barrel cam thus influences the movement of the carriage preceding it, which is unwanted as a rule.

BRIEF DESCRIPTION

It is an object of the invention to provide a drive unit which allows a reliable, jerk-free and fast takeover of a carriage from a separate drive unit.

In accordance with the invention, the barrel cam has a first barrel section and a second barrel section separate therefrom, with the barrel sections being drivable independently of one another and with the control device being configured to accelerate the carriage after a takeover from a separate drive unit by means of the first barrel section and to supply the accelerated carriage to the second barrel section. The barrel cam is therefore divided into at least two barrel sections so that two axial sections of the drive groove can be rotated with respect to one another. The first barrel section can thus be moved into a defined rotational position for a takeover of a carriage, while the second barrel section conveys one or more preceding carriages onward unaffected thereby—with a uniform or non-uniform rotation. After a corresponding acceleration of the carriage, an unimpeded transition of the follower can take place from the first barrel section to the second barrel section. The first barrel section thus so-to-say provides a reception groove which allows an unimpeded engagement of a follower as a result of the movement of the carriage and an acceleration of the associated carriage to a desired value. The invention therefore makes possible a considerably higher throughput in transport systems which have a barrel cam drive and an additional separate drive. The barrel cam drive is in particular provided in sections of the transport path in which a very precise positioning of the carriage is important, e.g. in stations at which a workpiece arranged on the carriage is machined.

The second barrel section preferably directly adjoins the first barrel section to ensure a smooth transition. It is sufficient in many practical cases for the barrel cam to have exactly two separately drivable barrel sections.

Provision can be made that the first and second barrel sections are arranged coaxially with respect to one another, in particular with the first barrel section being rotatably supported on a shaft of the second barrel section. This allows a particularly simple construction.

A special embodiment of the invention provides that the drive groove has a spirally extending section in the region of the first barrel section which extends over an angle of rotation of at most 180°. The first barrel section can accordingly be relatively short in the axial direction to save construction space.

The drive groove can have an introduction region at the inlet side in the region of the first barrel section, said introduction region extending in parallel with a direction of transport of the carriage and/or in parallel with an axis of rotation of the barrel cam. This allows a smooth and jerk-free engagement of a follower moving in the direction of transport into the drive groove of the barrel cam.

The drive groove can furthermore have a discharge region in a region of the first barrel section adjacent to the second barrel section, in which discharge region a pitch of the drive groove relative to an axis of rotation of the barrel cam in at least an end section facing the second barrel section corresponds to a pitch of the drive unit in an adjacent inlet section of the second barrel section. A jerk-free transfer of a carriage from the first barrel section to the second barrel section is thereby ensured.

Means can be provided for determining an instantaneous speed of rotation of the second barrel section and, optionally, of the first barrel section, with the control device being configured to accelerate the first barrel section after a takeover of the carriage from a starting speed of rotation which preferably amounts to zero to an end speed of rotation which corresponds to the instantaneous speed of rotation of the second barrel section. For example, a rotary sensor can detect the speed of rotation of a shaft of the second barrel section and, optionally, of the first barrel section, can output it as a signal and can transmit it to the control device. Provision can thus be made with the aid of the control device that the carriage does not undergo any jerk-like acceleration or delay on the transition onto the second barrel section.

The control device can be configured to drive the second barrel section to make a rotational movement at a constant speed of rotation. This is favorable in that such a drive of the second barrel section can be implemented easily. A variable speed of rotation of the second barrel section is also conceivable, however.

Means can also be provided for detecting an instantaneous rotational position of the first barrel section, with the control device being configured to move the first barrel section into a predefined rotational position after a supply of the carriage to the second barrel section for a takeover of a subsequent carriage. For example, a simple rotary encoder can detect the rotational position of the first barrel section, can output it as a signal and can transmit it to the control device. Provision can thus be made via the control that the follower of the carriage is incident onto an introduction opening of the drive groove in a desired manner on its arrival at the first barrel section. A rotary sensor can also be provided which is associated with the second barrel section to be able to detect the relative angular position of the two barrel sections and to be able to take it into account on the control of the first barrel section.

A further embodiment of the invention provides that the drive groove comprises a straight section in the region of the first barrel section extending in parallel with a direction of transport and/or in parallel with an axis of rotation of the barrel cam and a spirally extending section adjoining it. The straight section allows a jerk-free engagement of an arriving follower, while the spirally extending section serves for the acceleration of an engaging follower.

The control device is preferably configured to drive the first barrel section to make a rotational movement which accelerates the carriage as soon as the follower of a taken-over carriage has moved from the straight section into the spirally extending section. In other words, a rotational movement accelerating the carriage is avoided in the straight section to prevent unwanted compressive forces at the side walls of the straight section of the drive groove.

The drive groove of the second barrel section can have a constant pitch to ensure a uniform transport movement. If necessary, however, individual regions having a constant or varying pitch can also be interrupted by so-called latch threads within which the carriage is at a standstill despite the still rotating barrel cam in order e.g. to allow a workpiece machining. To implement specific movement profiles of the carriages, the pitch of the drive groove in the second barrel section can vary. The drive groove can e.g. have one or more latch threads and/or sections having different pitches.

The invention also relates to a method of transporting objects along a transport path in which a carriage which is travelable along the transport path and on which at least one object is to be arranged is moved from a transfer section of the transport path onto a process section of the transport path provided for a machining of the objects, wherein the carriage is driven in the process section by means of a first barrel cam which is drivable to make a rotational movement and which has a drive groove into which a follower arranged at the carriage engages, and wherein the carriage is driven to make a movement in the transfer section by means of a separate drive, in particular by means of a belt drive or linear drive.

As stated above, it is difficult to ensure a fast and jerk-free transfer of the carriage from one path section to another path section provided with a different type of drive when transporting objects along a transport path by means of a carriage and separate drives.

In accordance with the invention, the carriage for moving from the transfer section into the process section is—positively or negatively—accelerated by means of a second barrel cam drivable independently of the first barrel cam, with the second barrel cam in particular being arranged—viewed in the direction of transport—behind the first barrel cam.

The second barrel cam can be moved into a defined rotational position for a takeover of a carriage, while the first barrel cam conveys one or more preceding carriages onward uninfluenced thereby with a continuous, uniform or time-varying rotation. After a corresponding acceleration of the carriage, an unimpeded transition of the follower can take place from the transfer section into the process section.

Provision can be made that an instantaneous speed of rotation of the first barrel cam is determined and the second barrel cam is accelerated after a takeover of the carriage from a starting speed of rotation which preferably amounts to zero to an end speed of rotation which corresponds to the instantaneous speed of rotation of the first barrel cam. This allows a jerk-free transfer from the transfer section to the process section.

Provision can furthermore be made that the first barrel cam is driven to make a rotational movement at a constant speed of rotation and/or that the drive groove of the second barrel cam has a constant pitch. This allows a uniform transport movement within the process section. In general, the second barrel cam could also have at least one latch thread or sections having different pitches of the drive groove.

An embodiment of the invention provides that an instantaneous rotational position of the second barrel cam is detected and the second barrel cam is rotated into a predefined rotational position after a supply of the accelerated carriage to the first barrel cam for a takeover of a subsequent carriage.

The second barrel cam is preferably driven to make a rotational movement accelerating the carriage as soon as the follower of the carriage has moved from a straight section of a drive groove of the second barrel cam extending in parallel with a direction of transport and/or in parallel with an axis of rotation of the second barrel cam into an adjacent spirally extending section of the drive groove. A rotational movement in the straight section is therefore avoided to prevent unwanted compressive forces at the side walls of the straight section of the drive groove.

The rotational position of the first barrel cam is preferably detected by means of a corresponding sensor to influence the rotational movement of the first barrel cam such that the two barrel cams are synchronized for transferring the carriage.

The invention further relates to a transport apparatus for transporting objects along a transport path having at least one carriage which is travelable along the transport path and which is configured for receiving at least one object to be transported, and having means for a controlled driving of the carriage.

Transport apparatus of this kind serve inter alia in assembly and automation engineering to move workpieces to a machining and/or assembly station. One or more workpieces are arranged for this purpose on the carriage which is e.g. displaceably guided at a rail arrangement. The transport path defined by the rail arrangement can be open or closed and can comprise straight and curved sections. The workpieces are frequently supplied consecutively to a plurality of machining and/or assembly stations. A barrel cam such as described above can be provided to drive the carriage. An advantage of a drive by means of a barrel cam is the high positioning accuracy associated therewith. However, no high travel speeds can generally be reached with such a drive. This generally does not represent any great disadvantage within a machining and/or assembly station since the corresponding travel distances are typically relatively short. In many applications, however, relatively long travel distances have to be covered between the individual machining and/or assembly stations. A drive by means of barrel cams produces considerably delays in the total process here. In addition, precisely produced barrel cams are very complex and/or expensive in manufacture.

In accordance with the invention, the transport path comprises at least one process section provided for a machining of the objects and at least one transport section separate therefrom, wherein a drive unit having at least barrel cam drivable to make a rotational movement is provided for driving the carriage in the process section, the barrel cam having a drive groove into which a follower arranged at the carriage engages, and wherein a linear motor having at least one fixed-position stator element and one runner element arranged at the carrier is provided for driving the carriage in the transfer section.

The process section can be any desired region of the transport path in which a process relating to the machining and/or the assembly of the objects is carried out during the operation of the transport apparatus. In contrast, only a conveying of the objects along a conveying direction is required, for example, in the transfer section of the transport path. The invention is inter alia based on the recognition that a high positioning accuracy, but not a high transport speed, is as a rule required in the process sections, while, conversely, a high transport speed is important in transfer sections, but not a high positioning accuracy. The effectiveness of a transport apparatus can therefore be increased in that a fast and inexpensive linear drive is provided in the transfer sections, while a barrel cam drive is used in those regions in which a high positioning accuracy is particularly important. The drive unit provided in the process section can in particular be configured as described above. Furthermore, a control device which is configured to carry out a method such as described above can be provided for the controlled driving of the carriage.

In general, the transport path can have any desired geometry to take account of the respective demands. With a circular geometry of the transport path, a rotary indexing table is substantially implemented—seen from a functional aspect. Such a transport apparatus has the above-described advantages and can therefore be used more flexibly with respect to conventional rotary indexing tables. Independently of the geometry of the transport path, it is namely possible without problems in accordance with the invention to provide a plurality of process sections which are connected to one another by transfer sections. While all the workpieces arranged on the turntable of the table are moved synchronously with a classical rotary indexing table, the respective ideal movement characteristics can be set at different work stations separately and independently of the movement routines provided for the other work stations (process sections) of the transport apparatus with a transport apparatus in accordance with the present invention. This also applies to transport apparatus whose drive in the region of the transfer section is another type of drive than a linear drive, e.g. a toothed belt drive or the like.

Different types of drive can also be combined to generate a propulsion movement in the transfer sections. For example, different transfer sections are provided with different drive concepts and/or the transfer sections themselves have different drive types sectionally, as required.

Further developments of the invention are also set forth in the dependent claims, in the description and in the enclosed drawings.

The invention will be described in the following by way of example with reference to the drawings.

DETAILED DESCRIPTION

Figure 1:
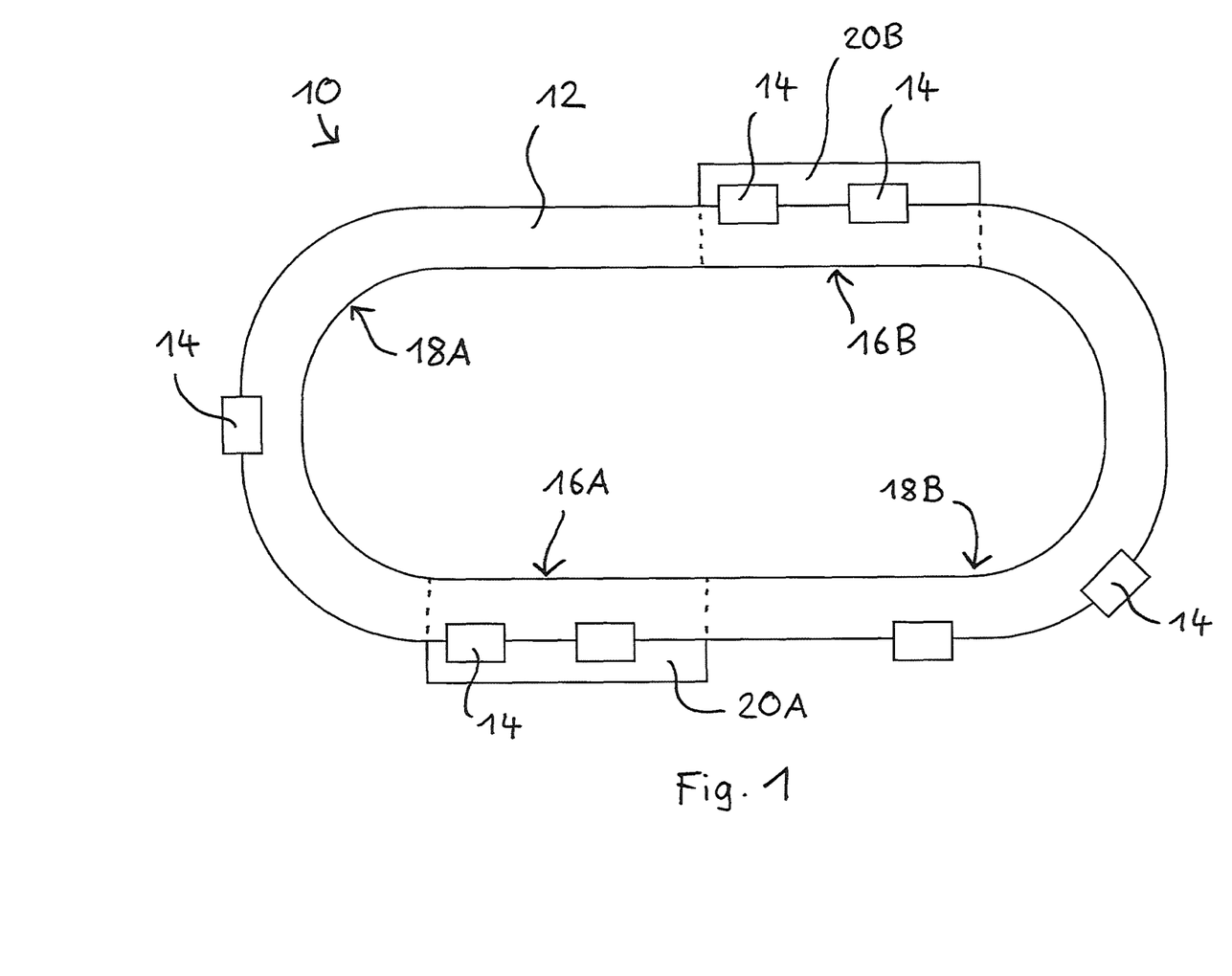
FIG. 1 is a simplified plan view of a transport apparatus in accordance with the invention for transporting objects along a transport path.

The transport apparatus 10 shown in FIG. 1 serves for the transport of objects, not shown, and comprises a rail 12 which defines a closed transport path along which the objects—e.g. workpieces—are transported. It is understood that the transport path could also be open and/or could have a different, e.g. more complex, extent. The transport path can also form a circle so that ultimately a rotary indexing table is implemented—viewed from a functional aspect—in which objects can be moved independently of one another.

A plurality of carriages 14 are guided at the rail 12 in a slidingly or rollingly travelable manner. The objects to be transported are arranged on a transport platform, not shown, of the carriages 14 and are traveled along the transport path with them. The transport path in the example shown is divided into two process sections 16A, 16B provided for a machining of the objects and indicated by dashed lines and into two transfer sections 18A, 18B respectively disposed therebetween. Depending on the application, the transport path can have any desired number of process sections 16A, 16B and transfer sections 18A, 18B.

The drive of the carriages 14 is based on a combination of two basically different drive systems. The drive of the carriages 14 in the two transfer sections 18A, 18B takes place by means of a linear motor arrangement, not shown, which comprises in a generally known manner fixed-position stator elements which are arranged along the rail 12 and respective runner elements which are arranged at the carriages 14. The carriages 14 can be traveled by means of the linear motor arrangement at a high speed between the process sections 16A, 16B. An electronic control unit, which is not shown in FIG. 1, is provided for controlling the linear motor arrangement.

The drive of the carriages 14 in the two process sections 16A, 16B does not take place by means of a linear motor, but rather by means of respective drive units 20A, 20B which have barrel cams drivable to make a rotational movement, as will be explained in more detail in the following with reference to FIGS. 2 to 5.

Each of the two drive units 20A, 20B comprises a barrel cam 22 which is drivable to make a rotational movement about an axis of rotation D by means of a motor arrangement 24. The barrel cam 22 comprises a drive groove 26.

The drive units 20A, 20B are each arranged next to the rail 12 (FIG. 1) such that followers, not shown, provided at the carriages 14 engage into the drive groove 26 when the corresponding carriage 14 enters into the associated process section 16A, 16B. Due to the cooperation of the drive groove 26 and the follower, the respective carriage 14 is moved in a direction of transport T extending in parallel with the axis of rotation D. Such a drive of a travelable carriage 14 by means of a barrel cam 22 driven—as required—to make a uniform or a time-varying rotational movement is generally known and allows a high positioning accuracy which is significant for the machining of the objects arranged on the carriage 14 in the process sections 16A, 16B

To facilitate the transfer of the carriages 14 from a transfer section 18A, 18B into the process section 16A, 16B adjoining it, the barrel cam 22 is divided into two separate coaxial barrel sections 30A, 30B. The drive groove 26 is designed as substantially spiral in the region of the barrel section 30B. It can, however, generally have one or more latch threads and/or sections having different pitches. The barrel sections 30A, 30B are drivable independently of one another by means of respective single motor units 32A, 32B of the motor arrangement 24 and of associated transmission units 34A, 34B.

Figure 2:
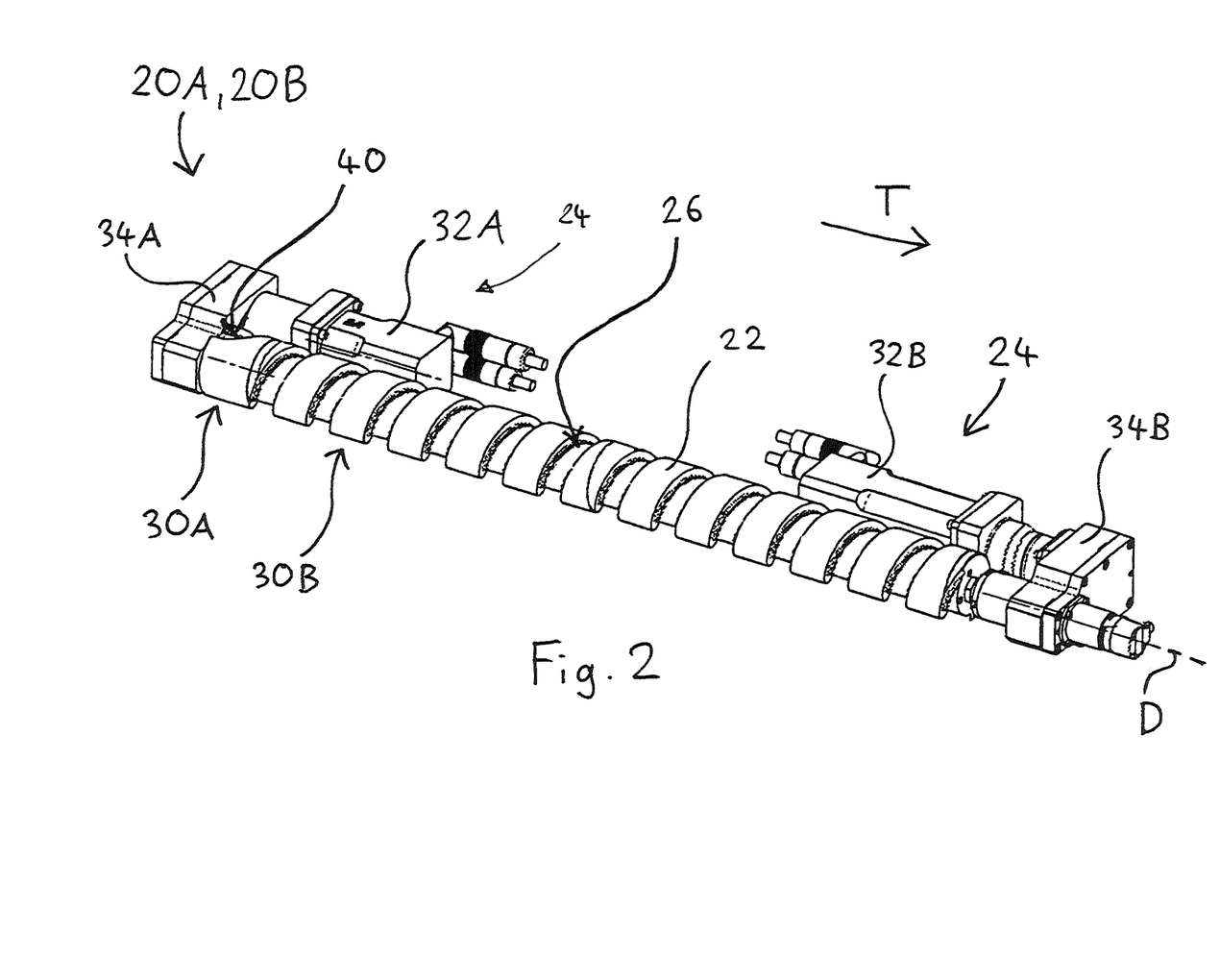
FIG. 2 is a perspective view of a drive unit of the transport apparatus shown in FIG. 1.
Figure 3:
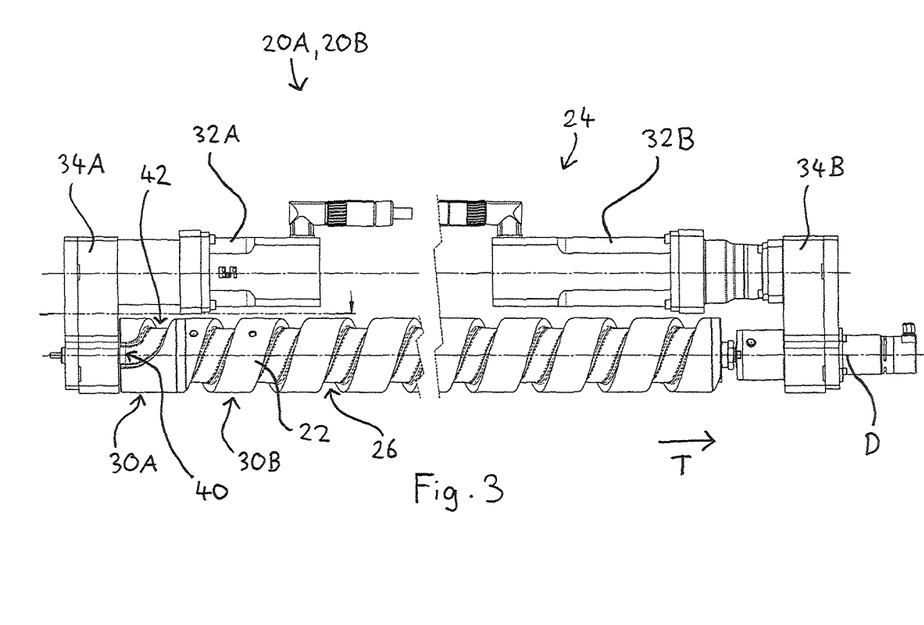
FIG. 3 is a partial plan view of the drive unit in accordance with FIG. 2.

As can be seen from FIGS. 2 and 3, the first barrel section 30A at the front with respect to the direction of transport T is substantially shorter than the second barrel section 30B. The first barrel section 30A can therefore be rotatably supported on a shaft of the second barrel section 30B which acts in this respect as a total shaft of the barrel cam 22.

Figure 4:
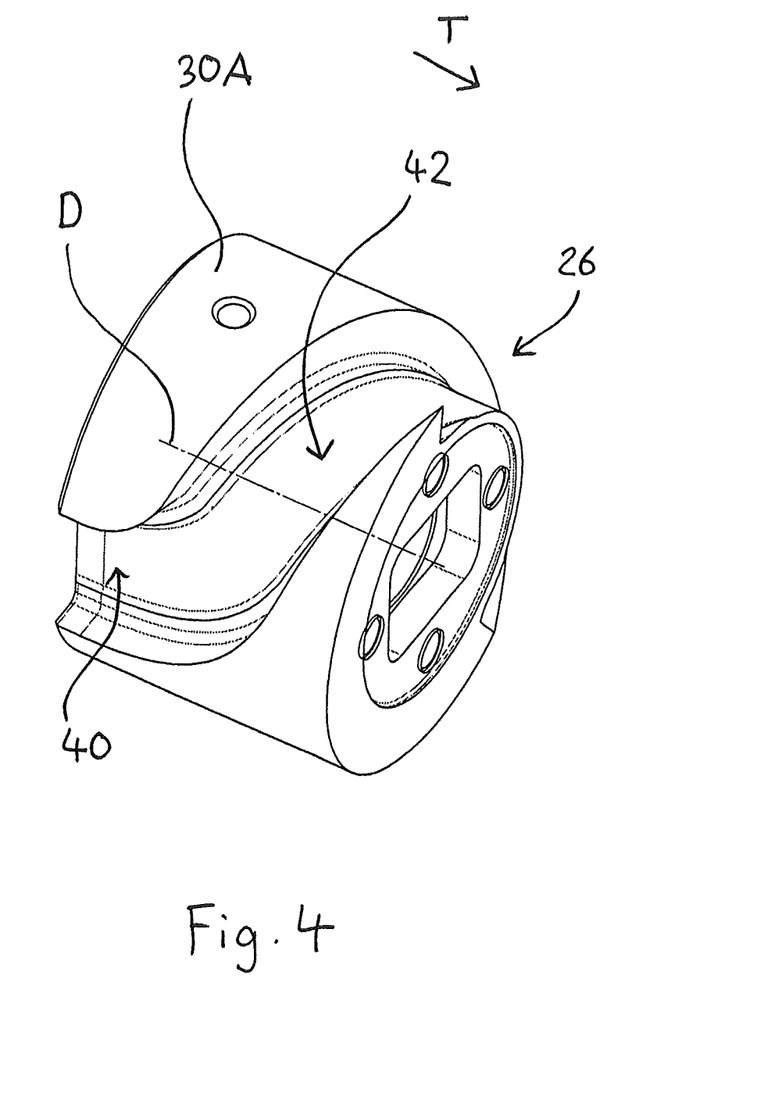
FIG. 4 is a perspective view of a barrel cam of the drive unit shown in FIG. 2.
Figure 5A:
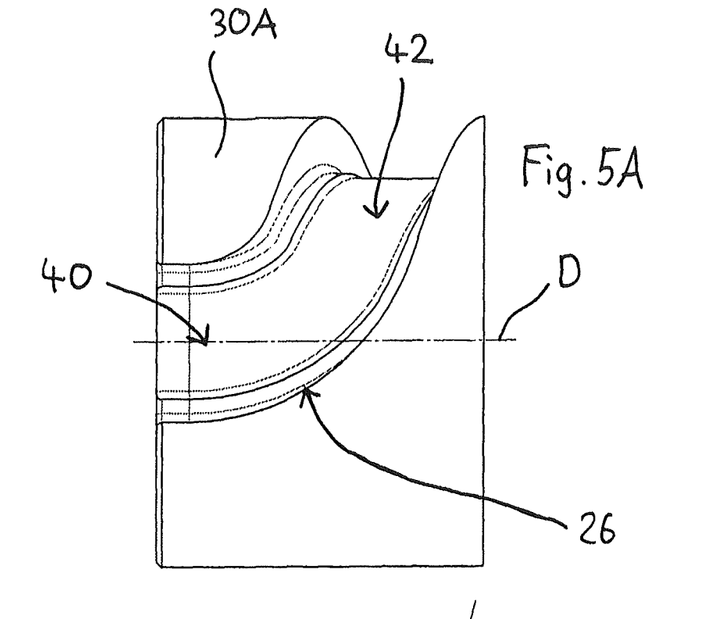
FIG. 5A shows the barrel cam in accordance with FIG. 4 in a plan view.
Figure 5B:
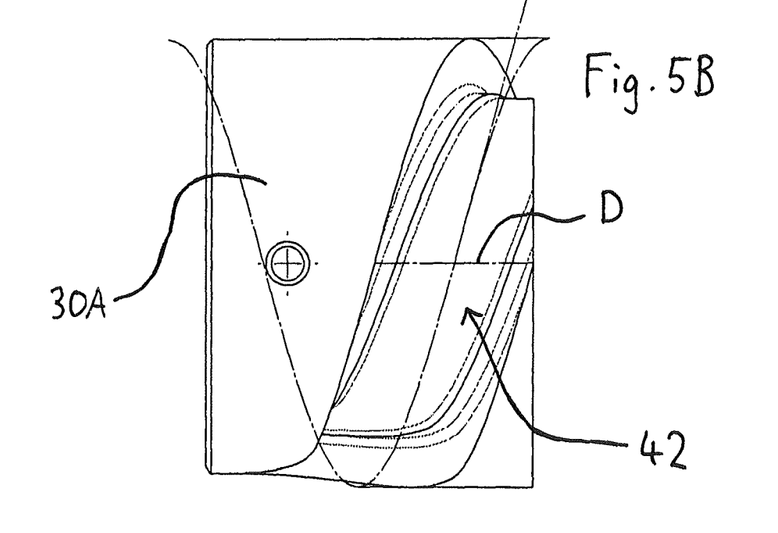
FIG. 5B shows the barrel cam in accordance with FIG. 4 in a side view.

While the drive groove 26 in the present example—as already explained—has a constant pitch in the region of the second barrel section 30B, it comprises a straight section 40 extending in parallel with the direction of transport T and in parallel with the axis of rotation D of the barrel cam 40 and a spirally extending section 42 adjoining it in the region of the first cam section 30A. The spirally extending section 42 has a pitch which corresponds to the pitch of the drive groove 25 in the inlet region of the second barrel section 30B and it extends over an angle of rotation which amounts to between 90° and 180° here.

Respective sensors, not shown, are provided at the drive units 20A, 20B to detect the speeds of rotation and the instantaneous rotational positions of the barrel sections 30A, 30B. The sensors are in signal connection with a control device. The control device associated with the drive units 20A, 20B and the control unit of the linear motor arrangement preferably form a common control.

During the operation of the transport apparatus 10, carriages 14 having objects arranged thereon are consecutively taken over by the drive units 20A, 20B from the transfer section 18A, 18B preceding with respect to the direction of transport T. The control device provides that the second barrel section 30B is driven to make a rotational movement at a speed of rotation adapted to the corresponding process section 16A, 16B to generate a desired movement profile of the carriages 14 in this region. The first barrel section 30A is stationary for the takeover of the carriages 14, with the straight section 40 of the drive groove 26 facing upward, as shown in FIGS. 2 and 3. A follower provided at the lower side of an arriving carriage 14 can thus engage in a jerk-free manner and as a result of the movement effected by the linear motor arrangement of the transfer section 18A, 18B into the section 40 of the drive groove 26. As soon as the follower of a carriage 14 taken over in this manner has moved from the straight section 40 into the spirally extending section 42, the first barrel section 30A is driven to make a rotational movement. The rotational movement is accelerated until the speed of rotation of the first barrel section 30A corresponds to the speed of rotation of the second barrel section 30B and an outlet region of the section 42 and an inlet region of the part of the drive groove 26 provided at the barrel section 30B merge into one another. In other words, the section 30A is accelerated until a synchronization of the sections 30A, 30B has been achieved. The follower of the carriage 14 accelerated in this manner then moves in a jerk-free manner into the second barrel section 30B and is transported by it along the direction of transport T. It is understood that the second barrel section 30B can simultaneously transport a plurality of carriages 14 in dependence on its length and on the dimensions of the carriages 14, if this is desired.

As soon as the carriage 14 has been supplied to the second barrel section 30B, the control device provides that the first barrel section 30A is again moved into the reception rotational position shown in FIGS. 2 and 3 for a takeover of a following carriage 14.

Due to the configuration of the drive units 20A, 20B, which can also be designed differently, with a plurality of separate barrel sections 30A, 30B which can be driven independently of one another and due to the combined drive by means of the drive units 20A, 20B, on the one hand, and the linear motor arrangement, on the other hand, a particularly high throughput can be achieved in the machining of consecutively transported objects.

REFERENCE NUMERAL LIST 10 transport apparatus
12 rail
14 carriage
16A, 16B process section
18A, 18B transfer section
20A, 20B drive unit
22 barrel cam
24 motor arrangement
26 drive groove
30A first barrel section
30B second barrel section
32A, 32B single motor unit
34A, 34B transmission unit
40 straight section
42 spirally extending section
D axis of rotation
T direction of transport

The invention claimed is:

1. A drive unit for driving a carriage travelable along a transport path, the drive unit having a barrel cam, with the barrel cam being drivable to make a rotational movement and the barrel cam having a drive groove for an engagement of a follower arranged at the carriage, the drive unit further having a control device for controlling the drive of the carriage,
the barrel cam having a first barrel section and a second barrel section separate from the first barrel section, with the first and second barrel sections being drivable independently of one another, and with the control device being configured to accelerate the carriage after a takeover from a separate drive unit by means of the first barrel section and to supply the accelerated carriage to the second barrel section,
the drive groove comprising a straight section extending in parallel with at least one of a direction of transport (T) and an axis of rotation (D) of the barrel cam and wherein the drive groove comprises a spirally extending section adjoining the straight section in the region of the first barrel section.

2. The drive unit in accordance with claim 1, wherein the second barrel section directly adjoins the first barrel section.

3. The drive unit in accordance with claim 1,
wherein the first and second barrel sections are arranged coaxially to one another.

4. The drive unit in accordance with claim 1, wherein the drive groove has a section in the region of the first barrel section, with the section extending spirally and over an angle of rotation of at most 180°.

5. The drive unit in accordance with claim 1, wherein the drive groove has an introduction region at an inlet side of the barrel cam in the region of the first barrel section, said introduction region extending in parallel with at least one of a direction of transport of the carriage and an axis of rotation of the barrel cam.

6. The drive unit in accordance with claim 1, wherein the drive groove has a discharge region in a region of the first barrel section adjacent to the second barrel section, in which discharge region a pitch of the drive groove relative to an axis of rotation of the barrel cam corresponds to a pitch of the drive groove in an adjacent section of the second barrel section.

7. The drive unit in accordance with claim 1, wherein means are provided for determining an instantaneous speed of rotation of the second barrel section and, optionally, of the first barrel section, with the control device being configured to accelerate the first barrel section after a takeover of the carriage from a starting speed of rotation to an end speed of rotation which corresponds to the instantaneous speed of rotation of the second barrel section.

8. The drive unit in accordance with claim 1, wherein the control device is configured to drive the second barrel section to make a rotational movement at a constant speed of rotation.

9. The drive unit in accordance with claim 1, wherein means are provided for detecting an instantaneous rotational position of the first barrel section, with the control device being configured to move the first barrel section into a predefined rotational position after a supply of the carriage to the second barrel section for a takeover of a subsequent carriage.

10. The drive unit in accordance with claim 1, wherein the control device is configured to drive the first barrel section to make a rotational movement which accelerates the carriage as soon as the follower of a taken-over carriage has moved from the straight section into the spirally extending section.

11. The drive unit in accordance with claim 1, wherein the drive groove of the second barrel section has a constant pitch.

12. A method of transporting objects along a transport path in which a carriage which is travelable along the transport path and on which at least one object is to be arranged is moved from a transfer section of the transport path onto a process section of the transport path provided for a machining of the objects, wherein the carriage is driven in the process section by means of a first barrel cam which is drivable to make a rotational movement and which has a drive groove into which a follower arranged at the carriage engages; and wherein the carriage is driven to make a movement in the transfer section by means of a separate drive, the carriage accelerated by means of a second barrel cam drivable independently of the first barrel cam to move from the transfer section to the process section, the second barrel cam driven to make a rotational movement accelerating the carriage as soon as the follower of the carriage has moved from a straight section of a drive groove of the second barrel cam extending in parallel with a direction of transport and/or in parallel with an axis of rotation of the second barrel cam into a spirally extending section of the drive groove adjoining it.

13. The method in accordance with claim 12, wherein an instantaneous speed of rotation of the first barrel cam is determined and the second barrel cam is accelerated after a takeover of the carriage from a starting speed of rotation which preferably amounts to zero to an end speed of rotation which corresponds to the instantaneous speed of rotation of the first barrel cam.

14. The method in accordance with claim 12, wherein the first barrel cam is driven to make a rotational movement at a constant speed of rotation; and/or wherein the drive groove of the second barrel cam has a constant pitch.

15. The method in accordance with claim 12, wherein an instantaneous rotational position of the second barrel cam is detected and the second barrel cam is rotated into a predefined rotational position after a supply of the accelerated carriage to the first barrel cam for a takeover of a subsequent carriage.

* * * * *